H. P. JOHNSON.
RIM EXPANDER.
APPLICATION FILED JUNE 12, 1917.
1,278,672.
Patented Sept. 10, 1918.
2 SHEETS—SHEET 1.
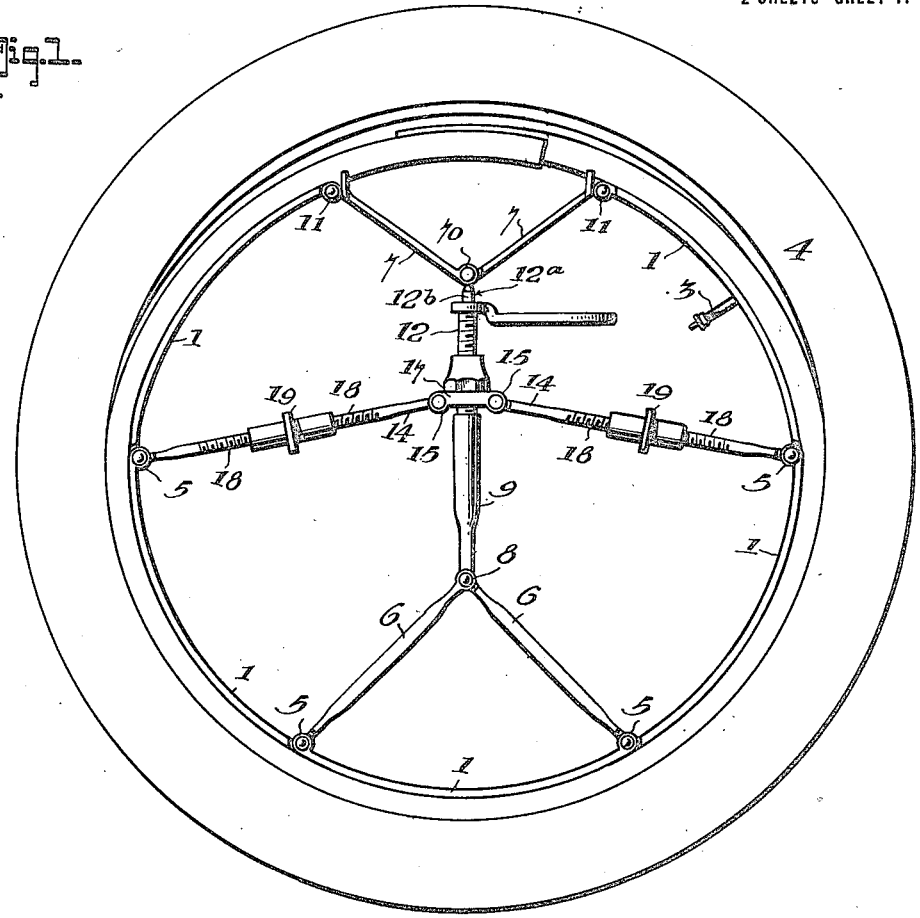
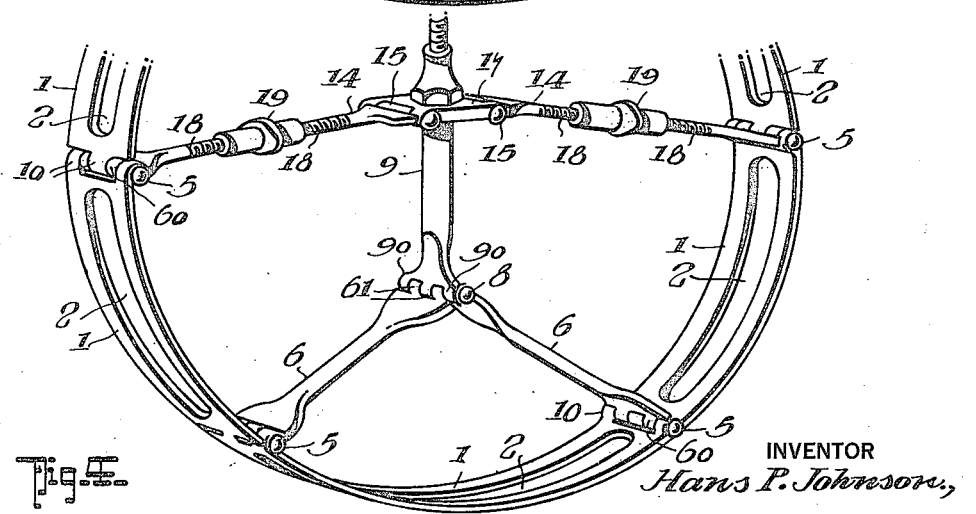
INVENTOR
Hans P. Johnson,
BY
Fred J. Dieterich
ATTORNEYS

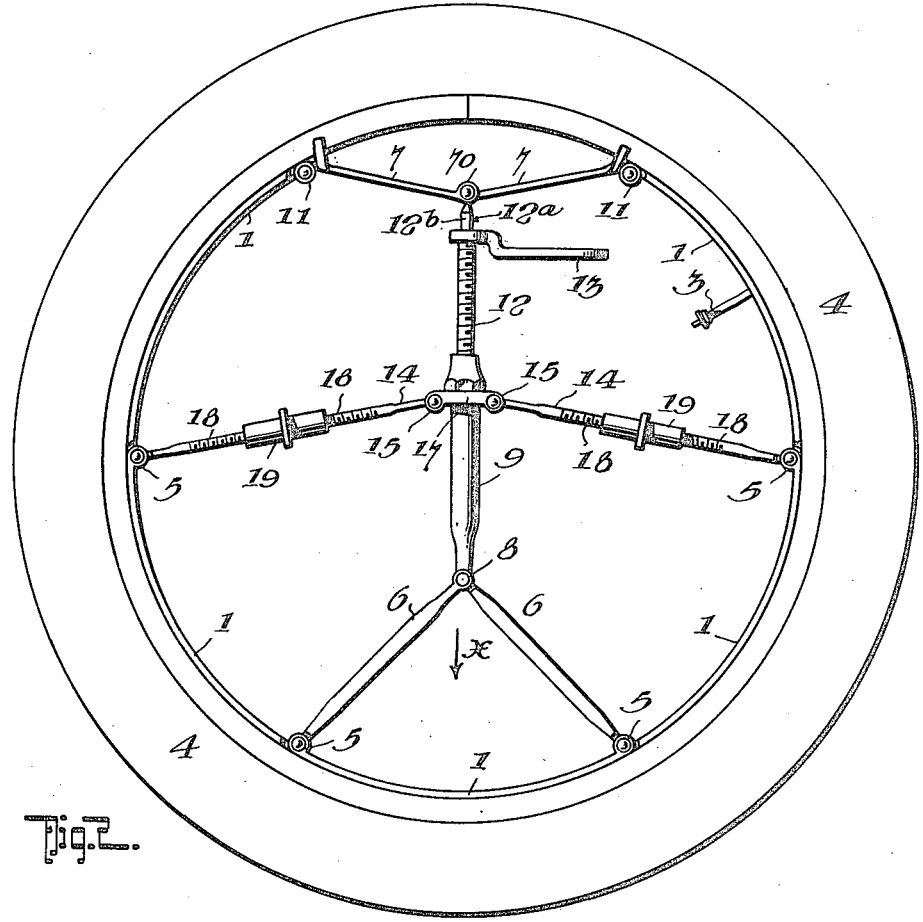
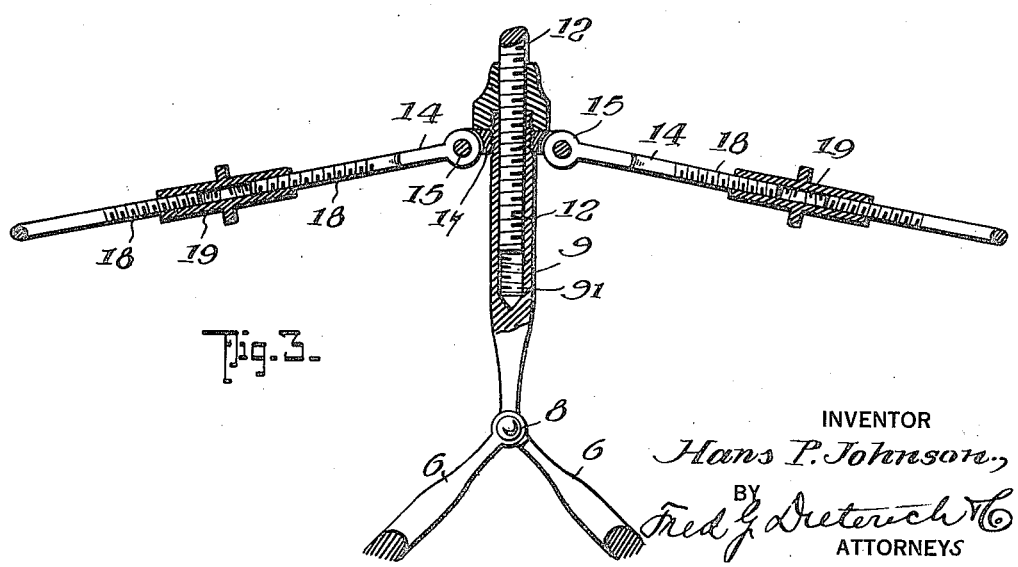

UNITED STATES PATENT OFFICE.

HANS P. JOHNSON, OF RACINE, WISCONSIN.

RIM-EXPANDER.

1,278,672.

Specification of Letters Patent.  Patented Sept. 10, 1918.

Application filed June 12, 1917.  Serial No. 174,267.

*To all whom it may concern:*

Be it known that I, HANS P. JOHNSON, a citizen of the United States, residing at Racine, in the county of Racine and State of Wisconsin, have invented a new and useful Rim-Expander, of which the following is a specification.

My invention has for its purpose to provide a simple, inexpensive, and easily applied device that is especially designed for expanding slip rims within auto wheel casings whereby to put it into place and firmly seat it within the casing and effect a perfect seating of the casing or tube edges upon the tire.

Another object of my invention is to provide a rim expander of the general type stated, in which the parts are arranged for effecting expansion of the rim in a plurality of places, preferably six, as hereafter more fully explained.

Again my invention has for its object to provide an improved construction of rim expander for demountable rim tires in which the expansion members are flexibly connected in such manner, whereby they may be conveniently applied against the inner face of the rim, provision being made in the several bearing sections for fitting over the valve stem attached to any of the usual types of casings.

With the above and other objects in view, my invention consists in the peculiar combination and arrangement of parts that are hereinafter described in detail, are specifically pointed out in the appended claims and illustrated in the accompanying drawings, in which:

Figure 1 is a face view of an automobile tire and the coöperating split rim with my invention applied, the rim being shown in its overlapped condition and the rim expander as being operated to expand the rim to its tire holding position.

Fig. 2 is a similar view, the rim being shown as having been expanded.

Fig. 3 is a detail section of the screw mechanism for expanding the several parts of my device, and Fig. 4 is a detail perspective of a portion of the expander.

In the practical embodiment of my invention, the same comprises a series, five being shown, of segmental expander sections 1—1, each of which is formed with a longitudinal slot 2, whereby any one of the said sections that may come in line with an inflated valve 3 of a tire casing or tube 4 may be readily put in place over the valve and held in such manner that danger of injury to the valve during the operation of spreading the rim is positively avoided.

The several expander sections, each of which consists of a flat band-like member, are hingedly connected with each other and to flexibly arranged expanding lever devices, by a hinge pin 5 that fits through eyes 10—60 formed on the coengaging ends of the said segmental sections 1 and the expanding lever devices, as is clearly shown in Fig. 4.

Two of the sections 1 have their adjacent ends spread and joined by a toggle connection, hereinafter termed the final expander device, which consists of two flat plates 7—7 hinged together at their inner ends as at 70 and each having its outer end hingedly connected with the coincident ends 11—11 of the separated sections 1—1, as shown.

The expander lever devices, before referred to, consist of a pair of divergingly connected lever arms 6 whose outer ends 60 hingedly connect with the segmental sections 1, as best shown in Fig. 4 and whose inner ends have hinge eyes 61—61 for receiving a hinge pin 8 that also connect the said eyes 61 with hinge eyes 90 formed on the lower end of a tubular member 9 whose upper end is internally threaded as at 91 for receiving the final spreader expanding screw 12 whose upper end 12$^a$ normally bears against the hinge joint of the two flat plates 7—7 and is squared as at 12$^b$ for receiving the turning lever or wrench 13, as shown, and which, when turned in proper direction, causes the screw 12 to feed upwardly out of the tube 9 and in bearing against the joint 70 of the final spreader, it operates to expand the two plates 7—7 laterally and thereby brings the split ends of the rim in proper endwise engagement.

For effecting a perfect seating of the rim around the inside of the tire casing, a yoke member 17 is mounted upon the tubular stem 9 and to each of the opposite ends of the said member 17, a pair of oppositely disposed laterally adjustable levers 14 are hingedly connected. Each of the levers 14 includes a hinged connection 15 for pivotally joining with its respective end of the yoke 7.

Each of the laterally projected lever devices consists of an inner and an outer member and each of the said members includes a screw threaded rod 18—18 connected with hand manipulated turn buckles 19—19, as shown.

From the foregoing description taken in connection with the drawings, the complete construction, the manner of its use and the advantages of my invention will be readily apparent to those skilled in the art to which it relates.

Assuming that it is the desire to secure a rim onto the inner face of the tire casing or tube, the spreader devices are mounted within the rim in the manner best shown in Fig. 1, which indicates the rim at a slightly collapsed condition.

The expanding levers or rods 18—18 are then extended by turning their respective turn buckles 19—19 which serves to open out the sections 1—1 and thereby cause the rim to seat, at the sides, against the tube or casing, it being understood that in adjusting the turn buckles 19—19, the tubular rod 9 is held to a proper vertical or central position.

After having applied the desired expansive pressure laterally on the sections 1—1, the operator turns the lever (14) which tends to feed the screw 12 upwardly out of the tube 9 and at the same time applies down pressure in the direction of the arrow $x$ on the hinged or head end of the diverging or bottom lever arms 6—6 which expand the lower sections 1—1 against the rim engaged thereby and at the same time pushes up on the hinge connection of the two flat links 7—7 whose ends are now caused to spread and effect the desired expansion of the rim at the upper part thereof so that the said rim takes the perfectly seated and interlocked position within the tire casing or tube, as indicated in Fig. 2.

Thus by my spreader or expander device I am enabled to effect a pressure on the rim at many different points simultaneously. By turning the lever 13 back, the parts are easily sufficiently loosened or rendered so flexible that they may be quickly removed from the wheel tire and folded up for carting or storage.

While I have specifically described the construction and the arrangement of the parts shown in the drawings, it is understood that I do not limit myself to the exact details shown and described since they may be readily varied or modified to suit the particular style of wheel for which they may be found best adapted without departing from my invention as expressed in the appended claims.

What I claim is:

1. A portable appliance for expanding a rim in an automobile tire, comprising a central support, a series of flexibly connected segmental sections adapted for seating against the inner face of the tire rim and means connecting the said sections and the central support, including devices for forcing the rim engaging sections against the rim under pressure.

2. A portable appliance for expanding a rim in an automobile tire, comprising a central support, a series of flexibly connected segmental sections adapted for seating against the inner face of the tire rim and means connecting the said sections and the central support, including devices for forcing the rim engaging sections against the rim under pressure, and for holding the said sections at the rim expanded position.

3. An appliance for expanding split rims for automobile tires, consisting of a series of flexibly connected segmental sections adapted for engaging the inner face of the rim when the latter is applied inside of a tire, a centrally disposed support, a pair of link members hinged to each other and to the adjacent ends of a pair of segmental sections, a pair of spreader arms flexibly connected to one end of the support and to a pair of flexible connections for the segmental sections, and a feed screw connecting the other end of the support and the aforesaid hinged link members and means for actuating the feed screw, whereby to expand the spreader arms and the link members.

4. An appliance for expanding split rims for automobile tires, consisting of a series of flexibly connected segmental sections adapted for engaging the inner face of the rim when the latter is applied inside of a tire, a centrally disposed support, a pair of link members hinged to each other and to the adjacent ends of a pair of segmental sections, a pair of spreader arms flexibly connected to one end of the support and to a pair of flexible connections for the segmental sections, and a feed screw connecting the other end of the support and the aforesaid hinged link members and means for actuating the feed screw, whereby to expand the spreader arms to the link members, and extensible supplemental spreader members, each connecting the support and a flexible joint of a pair of segmental sections.

5. A split rim spreader, consisting of a series of segmental presser members hingedly connected to form a ring-like body for seating against the rim when applied within an automobile tire, a pair of members linked to each other and to the adjacent ends of a pair of the segmental sections, a relatively stationary support, a pair of spreader members linked to one end of the support and to the segmental sections, a screw feed mounted on the support that engages the pair of link members and which serves to force the support, under pressure, against the pair of spreader members attached thereto, and a pair of extensible spreader members connecting the support and the segmental spreader sections, each of the extensible spreader members including a turn buckle connection, whereby to lengthwise adjust such spreader members.

6. An appliance for expanding split rims for automobile tires comprising the following elements in combination; a series of flat segmental rim bearing sections hingedly joined with each other to form a ring-like body, a pair of spreader members linked to each other and to the adjacent ends of a separated pair of the segmental members, a central support, a pair of extensible braces extended laterally of and flexibly connected with the support and the segmental bearing sections, a pair of spreader arms flexibly connected to one end of the support and to the segmental rim bearing sections, a screw feed mounted on the other end of the support and engaging the spreader links at that end and means for actuating the screw feed.

HANS P. JOHNSON.